Patented June 4, 1935

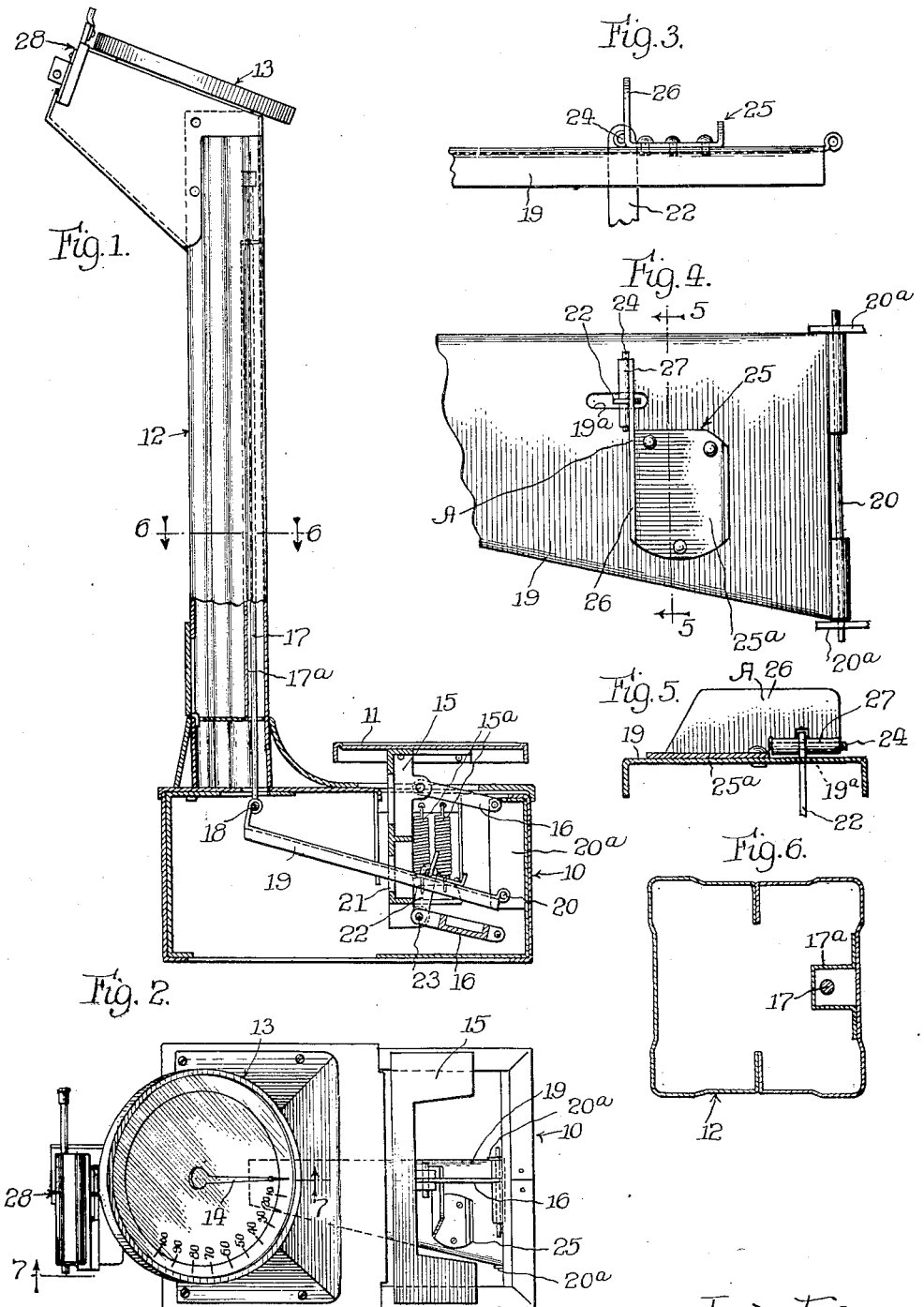
June 4, 1935.   M. H. HANSEN   2,003,360
WEIGHING SCALE
Filed Nov. 30, 1931   2 Sheets-Sheet 1
Inventor:
Marius H. Hansen,
By Arundel Parker Carlson
Attys.

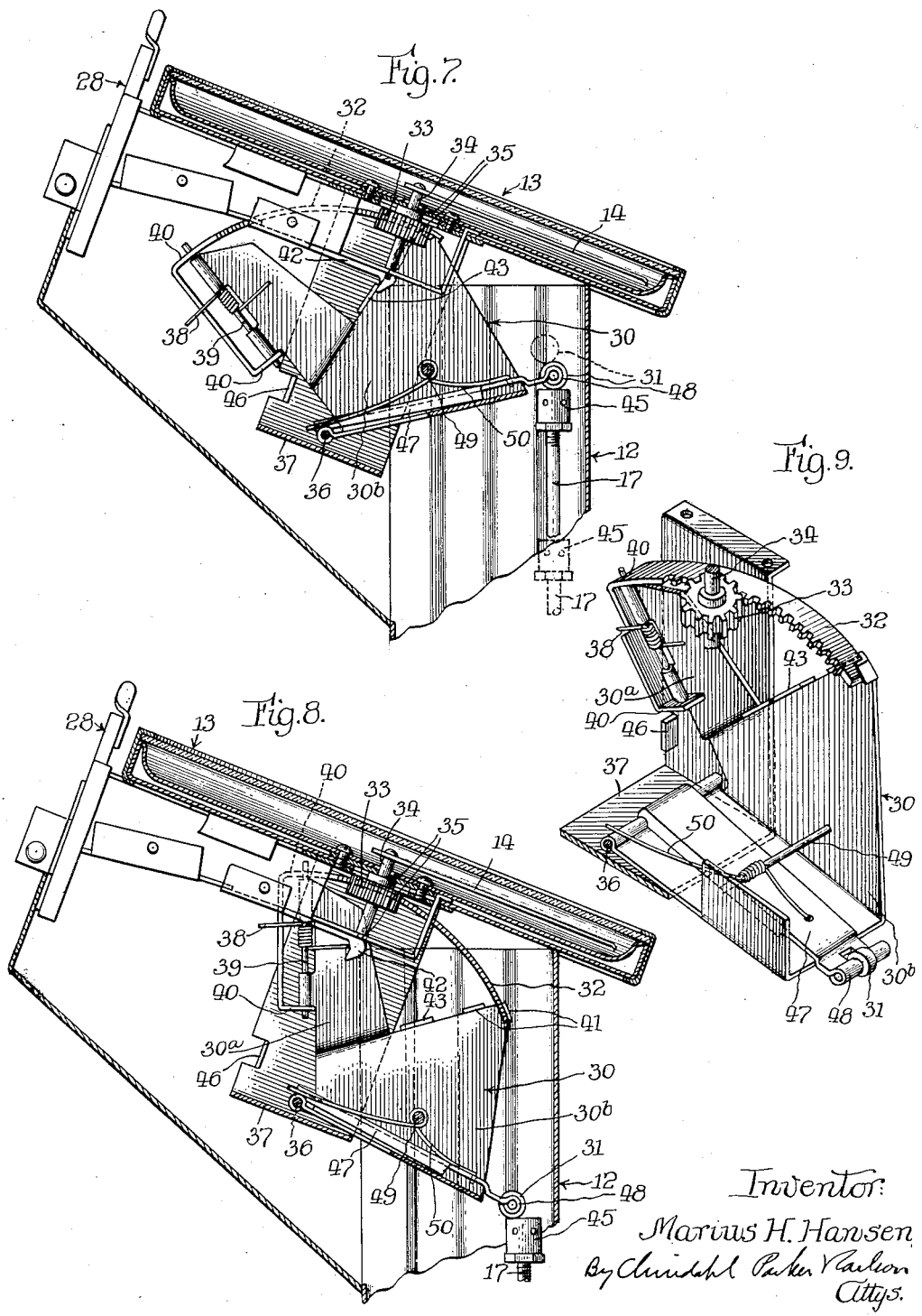

2,003,360

UNITED STATES PATENT OFFICE 2,003,360

WEIGHING SCALE

Marius H. Hansen, Chicago, Ill., assignor to Hanson Scale Company, Chicago, Ill., a corporation of Illinois Application November 30, 1931, Serial No. 577,953

5 Claims. (Cl. 265—68)

The invention relates generally to weighing scales and the primary object of the invention is to provide a new and improved scale which is simple and economical in construction and durable and accurate in operation.

In the production of a weighing scale having a dial or indicator of standardized form, the motion transmitting mechanism between the weighing mechanism and the indicator must be tested and adjusted in each scale through the use of standard weights so as to produce the proper reading on the indicator. An important object of the present invention is to provide motion transmitting mechanism for a weighing scale embodying adjusting means for this purpose which may be economically manufactured and easily and economically adjusted.

When scales of this character are constructed so as to be coin-controlled, the motion transmitting mechanism is such that one section thereof is moved positively by the platform while the other section is connected to the indicator and moves with the first section only when released by the coin-operated control device. The indicator and the mechanism associated therewith are returned to their normal latched positions by the weighing mechanism. In the use of such a scale, it has been found that children often amuse themselves by jumping up and down upon the scale platform. When this is done each sudden return movement of the weighing mechanism produces a considerable impact upon the indicator and the associated motion transmitting mechanism tending to move the same in a reverse direction beyond their normal or zero positions.

Another important object of the invention is to produce a weighing scale wherein the motion transmitting mechanism is constructed so as to avoid breaking or bending when subjected to such treatment.

More specifically, it is an object to provide such motion transmitting mechanism wherein the return movement of the indicator by the weighing mechanism is accomplished through the medium of a yieldable resilient connection arranged to absorb shocks resulting from sudden return movement of the weighing mechanism.

Another object is to produce a coin-controlled weighing scale wherein the portion of the motion transmitting mechanism which is directly associated with the indicator is constructed and arranged in a novel manner which facilitates and reduces the cost of manufacture and insures maintenance of the desired relation of the parts.

Other objects and advantages will become apparent from the following description taken in connection with the accompanying drawings which illustrate a preferred embodiment of the invention, and in which:

Figure 1 is a side elevational view of a weighing scale embodying the features of the invention, certain portions of the casing being broken away to illustrate the interior construction.

Fig. 2 is a plan view of the scale shown in Fig. 1 with the platform and one portion of the top wall of the base removed so as to show the interior construction.

Fig. 3 is an enlarged fragmental view of a portion of the main transmitting mechanism housed within the base.

Fig. 4 is a plan view of the mechanism shown in Fig. 3.

Fig. 5 is a sectional view taken along the line 5—5 of Fig. 4.

Fig. 6 is a sectional view taken along the line 6—6 of Fig. 1.

Fig. 7 is an enlarged fragmentary sectional view taken substantially along the line 7—7 of Fig. 2 and showing a portion of the motion transmitting mechanism in its normal or zero position.

Fig. 8 is a view similar to Fig. 7 with the mechanism in its released position.

Fig. 9 is a perspective view of a portion of the mechanism shown in Figs. 7 and 8.

Generally considered, the invention as herein disclosed is embodied in a weighing scale comprising a platform-operated weighing mechanism contained within a base having a column upstanding therefrom and supporting an indicator at its upper end. A rod or wire operatively connected to the weighing mechanism and extending upwardly through the column, serves through a one-way connection with the indicator to control the movement of the indicator away from its zero position and to return it to its zero position when the weighing mechanism returns to its normal position. By reason of the one-way connection between the weighing mechanism and the indicator, the indicator may be held close to its zero position by a suitable coin-controlled detent, even though the weighing mechanism is actuated.

Referring more particularly to the drawings, the invention is embodied in a scale having a box-like base 10 (Figs. 1 and 2) with a vertically movable platform 11 at one end thereof and a hollow column 12 upstanding from the other end, which carries on its upper extremity an indicator comprising a substantially horizontal glass covered dial 13, and an enclosed pointer 14.

The weighing mechanism is preferably, although not necessarily, of well known construction of the general type disclosed in my prior Patent No. 1,638,260 issued August 9, 1927, and, as herein shown, this weighing mechanism is actuated by a vertical frame 15 (Figs. 1 and 2) which supports the platform 11 and is guided and controlled in its movement by levers 16 pivoted at their opposite ends to the base 10 and the frame 15. Downward movement of the frame 15 is resisted by springs 15a.

For the purpose of controlling the movement of the pointer 14 in accordance with the movement of the weighing mechanism above described, a rod 17 extends upwardly through the column 12 from the base within a protecting casing 17a. The rod 17 is mounted for longitudinal movement and has its lower end pivoted at 18 upon the free end of a lever 19 which extends from front to rear in the base 10. The other or forward end of the lever 19 is pivoted at 20 on a bracket 20a fixed on the forward wall of the base 10, as shown in Fig. 1, and the lever extends freely through a suitable opening 21 (Fig. 1) formed in the frame 15. In order that movement of the platform may transmit a corresponding movement to the lever 19, a link 22 is provided therebetween. The link 22 has its lower end pivoted at 23 to the frame 15 midway between the two sides thereof on an axis parallel to the pivot 20. At its other end the link 22 is pivoted at 24 to the lever 19 above the lever intermediate the ends thereof. As shown in Figs. 2, 3 and 4, the lever 19 is preferably formed from sheet metal, flanged along its edges to provide stiffness, and of considerable width so as to prevent lateral wobbling. With this form of lever, an opening 19a is provided through which the link 22 extends.

It will be apparent that the distance between the pivot 24 and the pivot 20 determines the amount of movement of the lever 19 with relation to the amount of movement of the frame 15. It is of course desirable that the lever 19 and the rod 17 be moved a predetermined distance for any given weight placed upon the platform 11 in order that the proper weight may be indicated upon the standardized dial 13. Provision is therefore made for adjusting the distance between the pivots 20 and 24 and to this end a sheet metal bracket 25 is secured upon the upper surface of the lever 19. The bracket 25 has an upstanding flange 26 which projects laterally of the lever beyond the base portion 25a of the bracket and across the opening 19a, as shown in Figs. 4 and 5 and the projecting portion of the flange is curled at 27 along its lower edge to receive a pin which forms the pivot 24. It will be seen that by bending the flange 26 substantially at the point A (Figs. 4 and 5) the location of the pivot 24 may be shifted slightly toward or away from the pivot 20. This may be accomplished by the use of pliers, or if desired, a suitable slotted tool (not shown) may be provided for this purpose. The flange 26 is made of such a thickness and of such a metal that after it has been bent to any particular position in the process of assembling the scale, it will retain this adjusted position permanently.

In adjusting the flange 26 of the bracket, considerable force is applied thereto tending to rotate the lever 19 about a vertical axis. The bracket 20a is therefore of considerable width as shown in Fig. 4, so that the lever 19 may engage the pivot 20 at points spaced a considerable distance apart whereby to impart transverse stability to the lever.

Between the rod 17 and the pointer 14, means is provided for moving the pointer in a clockwise direction away from its zero position, under the control of a coin-operated device 28, and in accordance with the movement of the weighing mechanism. When released, this means moves to an extent determined by the vertical position of the rod 17, which in its upward movement returns the means to its initial position. This means is preferably of such a character that the parts are rugged and may be easily and economically manufactured and assembled.

In the form illustrated this means comprises a pivoted or rocking carrier 30 operatively associated with the pointer 14 and having a roller 31 thereon adapted to rest upon the upper end of the rod 17. The operating connection between the carrier 30 and the pointer 14 is preferably provided by a rack 32 meshing with a pinion 33, the pinion being positioned on a shaft 34 which carries the pointer 14 and is supported by bearings 35. The carrier 30, in order to insure proper engagement of the roller 31 with the rod 17, is pivoted on a horizontal axis provided by a pin 36 fixed in the lower ends of a U-shaped bracket 37 which depends from the dial 13. By locating the pivot pin 36 in the plane of the shaft 34 and forming the rack 32 arcuately and centered upon the pin 36, continuous alinement of the pinion and rack is insured, and to maintain a firm mesh therebetween the rack 32 is preferably mounted on the carrier for pivotal movement toward the periphery of the pinion 33 under the action of a spring 38.

As shown in Figs. 7 to 9, the carrier has an arm portion 30a carrying a radially extending pivot pin 39, and one end of the rack 32 is bent to a generally U-shaped form to provide portions 40 engaging the ends of the pin 39. The spring 38 being of the torsion type encircling the pin 39 and having its opposite ends engaging respectively the arm portion 30a and the bottom of the U-portion of the rack, serves to urge the rack yieldingly against the pinion 33 whereby automatically to take up wear and prevent undue noise and inaccuracy in the scale. The other end of the rack 32 is guided in this lateral movement by lugs 41 formed on another arm or lever portion 30b of the carrier 30, which portion 30b carries the roller 31 and extends from the pivot 36 toward the forward side of the column. With this construction the rack may be formed on the edge of a straight strip of sheet metal and then bent to the required arcuate form.

The arm portion 30b of the carrier 30 is preferably proportioned so that it tends to tip the carrier forwardly from the position shown in Fig. 7 to that shown in Fig. 8, so as to maintain the roller 31 in engagement with the rod 17. This movement is normally prevented by a detent 42 engaging a lug 43 on the carrier 30 as shown in Fig. 7, and controlled by the coin-actuated device 28. The coin-actuated control device and the detent 42 are described in detail in my copending application Serial No. 489,506 filed October 18, 1930, now Patent No. 1,838,993 and since the particular construction of these elements does not form part of the present invention it will suffice to say that the hooked end of the detent 42 is lifted and the carrier 30 released by means of the device 28.

When the weighing mechanism is in its normal position the rod 17 is elevated as shown in full lines in Fig. 7, and upon actuation of the weighing mechanism, the rod is moved downwardly to a position such as that shown in dotted outline in Fig. 7. The carrier 30 is, however, held in the position of Fig. 7 until the detent 42 has been raised, whereupon the carrier drops forwardly until the roller 31 engages the top of the rod. Proper engagement of the roller is insured and adjustment of the scale facilitated in the present instance by the provision of an enlarged adjustable head 45 mounted on the top of the rod 17.

When the weighing mechanism is allowed to return and raise the rod 17, the carrier is returned to its initial position of Fig. 7, and the detent 42 cams over the lug 43 into its operative position. To insure engagement of the detent, the carrier is permitted to move slightly beyond the position of Fig. 7 as determined by a stop 46 formed on the bracket 37. The stop 46 serves to prevent movement of the rack 32 out of engagement with the pinion 33.

It will be clear that when a person for any reason jumps up and down upon the platform 11, a series of sudden impacts will be impressed upon the roller 31. In order to prevent damage to the scale when this is done the present invention provides a resilient connection between the roller 31 and the carrier 30. To this end a lever 47 is pivoted at one end on the pin 36 and extends along the upper surface of the arm portion 30$^b$ of the carrier 30. The other end of the lever 47 extends beyond the end of the portion 30$^b$ and is bifurcated and curled as at 48 to provide for the mounting of the roller 31 thereon. Wound about a rod 49 mounted on the carrier 30 is a torsion spring 50 the opposite ends of which engage the lever 47 and the carrier 30 respectively so as to press the lever downwardly and yieldingly into abutment with the carrier.

This arrangement provides, in effect, a yielding lost motion connection arranged normally to assume the position shown in full lines in Fig. 7, but permitting movement of the roller independently of the carrier to the position shown in dotted outline in Fig. 7. Thus undue reverse movement of the pointer 14 beyond its zero position is prevented. Also it prevents imposition of positive forces or sudden impacts upon the rack and pinion or the carrier which would tend to break or bend these parts.

I claim as my invention:

1. A weighing scale comprising a base, weighing mechanism in said base, a platform carried by the base for actuating said mechanism, an indicator mounted on the base, and a controlling connection between said mechanism and said indicator including a lever pivoted in said base, a link having one end connected to said mechanism, a sheet metal bracket having one end secured to said lever and carrying a substantially vertical flange extending transversely of said lever and bendable laterally to shift said flange longitudinally of the lever, and means forming a pivotal connection between said flange and the other end of said link.

2. In a weighing scale, the combination of weighing mechanism, an indicator having a rotatable element, a pinion for operating said element, a carrier governed in its movement by said mechanism and pivoted on an axis perpendicular to and in the plane of the axis of said pinion, a pivot pin on said carrier extending radially with respect to the pivotal axis of said carrier, a rack pivoted at one end on said pivot pin and formed arcuately and centered on the axis of said carrier, the teeth of said rack facing toward and being engageable with said pinion, and a spring acting between the carrier and the rack to maintain said rack firmly in engagement with said pinion.

3. In a scale the combination of weighing mechanism, an indicator having an operating pinion, a carrier governed in its movement by said mechanism and pivoted on an axis perpendicular to and in the plane of the axis of said pinion, a pivot pin on said carrier extending radially with respect to the pivotal axis of said carrier, a rack pivoted at one end on said pivot pin and formed arcuately and centered on the axis of said carrier, the teeth of said rack facing toward and being engageable with said pinion, a spring acting to maintain said rack firmly in engagement with said pinion, and means on the carrier spaced from said pivot pin and operable to guide said rack in its movement toward and away from said pinion.

4. In a weighing scale, the combination of weighing mechanism, an indicator and connecting means therebetween for controlling the movement of the indicator in a forward direction away from its zero position and for causing return movement of the indicator, said means including a lost motion connection, a spring acting to maintain said lost motion connection extended, and arranged to absorb excessive return movements caused by the weighing mechanism, and a stop engaging a part of said connecting means between said lost motion connection and said indicator to limit the return movement of said indicator.

5. A weighing scale comprising weighing mechanism, an indicator, an element movable in advancing and return directions by said mechanism, a carrier operatively connected to said indicator to move the same and normally tending to produce movement of the indicator away from its zero position, and a pivoted lever associated with said carrier and having a part at its free end adapted to be moved into abutment with said element when said carrier is released by said device, and a spring acting between said lever and said carrier to absorb the shock caused by movement of said part into abutment with said element, said lever and said carrier having opposed abutments, normally maintained in engagement by said spring.

MARIUS H. HANSEN.